United States Patent [19]
Knibbe

[11] Patent Number: 4,928,180
[45] Date of Patent: May 22, 1990

[54] CAMERA WITH WELL DEFINED SHUTTER AND SUITABLE FOR RECORDING TELEVISION AND CINEMATOGRAPHIC IMAGES

[75] Inventor: Engel J. Knibbe, Eindhoven, Netherlands

[73] Assignee: U.S. Philips Corp., New York, N.Y.

[21] Appl. No.: 227,219

[22] Filed: Aug. 2, 1988

[30] Foreign Application Priority Data

Aug. 13, 1987 [NL] Netherlands ............... 8701900

[51] Int. Cl.$^5$ ............................................. H04N 5/232
[52] U.S. Cl. .............................. 358/213.13; 358/213.25
[58] Field of Search ................. 358/213.13, 213.22, 358/213.25

[56] References Cited

U.S. PATENT DOCUMENTS 4,499,496  2/1985  Tanaka et al. ............... 358/213.25
4,597,015  6/1986  Johnson ....................... 358/225
4,603,354  7/1986  Hashimoto et al. .......... 358/213.25

Primary Examiner—James J. Groody
Assistant Examiner—Robert M. Bauer
Attorney, Agent, or Firm—Marianne R. Rich

[57] ABSTRACT

A camera including a solid-state sensor (FT) of the charge transfer type, particularly a frame transfer sensor having a pick-up member (PP), a storage member (MP) and a parallel-in, series-out shift register member (SR), in which the number a of rows of radiation-sensitive pick-up elements (P) is larger than the number b of rows of storage elements (M) may be utilized for generating a picture signal which in television and cinematographic display has a picture definition in the field scanning direction which is increased by a factor of a/b. To this end the camera is provided with a specific shutter device (SH, SM) for shutting off a light radiation path (LP) towards the sensor pick-up member (PP) during a minimum shutter time which comprises a field blanking period and a fraction of a field scanning period, both of which durations combined form a field period, which fraction is equal to $$\frac{a-b}{a}.$$

4 Claims, 2 Drawing Sheets

CAMERA WITH WELL DEFINED SHUTTER AND SUITABLE FOR RECORDING TELEVISION AND CINEMATOGRAPHIC IMAGES

BACKGROUND OF THE INVENTION

The invention relates to a camera suitable for recording television, cinematographic and possibly photographic images, which camera includes a solid-state sensor of the charge transfer type, said sensor comprising a picture pick-up member for converting in its pick-up elements radiation incident via a radiation path into local charge packets as picture information, a storage member comprising storage elements for storing the picture information, the pick-up and storage elements being present in rows and columns and the number of rows of storage elements being smaller than the number of rows of pick-up elements, and a parallel-in, series-out shift register member which is coupled to a sensor signal output for the supply of a picture signal as picture information generated in line and field periods with line and field scanning periods and line and field blanking periods, said camera also including a shutter device arranged in the radiation path towards the picture pick-up member of the sensor and a control signal generator for controlling the picture information transfer in the sensor and for controlling the shutter device for passing or not passing radiation.

Such a camera for recording television, cinematographic and photographic images is known from U.S. Pat. No. 4,499,496. In this camera the number of rows of pick-up elements is twice as large as the number of rows of storage elements. The Patent states that the number of rows of storage elements is equal to the number of television picture display lines laid down in one of the television broadcasting standards. In the known camera an advantage is obtained in both photographic recording and television recording and comparable cinematographic recording by the choice of the different numbers of rows.

When recording a photographic image, the shutter device shuts off the radiation path towards the picture pickup member of the sensor after a given exposure time. Subsequently a parallel information shift is effected periodically per line period from the rows of pick-up elements via the rows of storage elements to the parallel-in, series-out shift register member of the sensor. After each parallel shift during the line blanking period into the shift register member a serial information shift to the sensor signal output is effected in this member during the line scanning period. The result is that a picture signal for displaying a photographic image having a number of photographic picture lines which is equal to the number of rows of pick-up elements of the sensor is generated in a field period.

When recording television or comparable cinematographic images, the picture information is parallel shifted from the rows of pick-up elements from the pick-up member to the storage member after each picture recording during a field blanking period and with the shutter device being shut. During this shift a parallel addition of picture information in the first row of storage elements is effected in the storage member, which addition is different for first and second field periods, namely an addition for a given row of pick-up elements with the superjacent row in the one field period and with the subjacent row in the other field period. The shift frequency at the storage member is then half that at the pick-up member. Due to the different additions the sensor signal output supplies an interlaced picture signal in a frame period equal to two field periods. The sensor operates in the manner described as a so-called frame transfer sensor. The result is that an interlaced picture signal is generated for displaying television or cinematographic images with a number of picture lines which is equal to the number of rows of storage elements of the sensor.

The camera described appears to be suitable both for generating interlaced picture signals in a simple manner for displaying television or cinematographic images and for generating a picture signal for displaying photographic images with a picture definition in the field scanning direction which is then twice as high.

SUMMARY OF THE INVENTION

It is an object of the invention to realize a camera including a sensor whose number of rows of pick-up elements is larger than the number of rows of storage elements and with a specific action of the shutter device, which camera is thereby suitable for the supply of interlaced or noninterlaced picture signals with a picture definition in the field scanning direction which is higher than when displaying television or cinematographic images. To this end a camera according to the invention is characterized in that the shutter device shuts off the radiation path towards the pick-up member of the sensor during a minimum shutter time comprising the field blanking period followed by a fraction of the field scanning period, which fraction is equal to the quotient of the difference number between the numbers of the 0 rows of pick-up elements and of storage elements and the number of the rows of pick-up elements.

In this case the picture definition in the field scanning direction is increased by a factor which is equal to the quotient of the (larger) number of rows of pick-up & elements and of the number of rows of storage elements, whilst the line period which is present at the increased picture definition is smaller by the reverse factor than that associated with a picture composed of a number of picture lines which is equal to the number of rows of storage elements.

An embodiment of a camera according to the invention in which the specific shutter action is realized in a simple manner is characterized in that when using the shutter device having a shutter which is rotatable in the radiation path in front of the pick-up member of the sensor and which is formed as a sector disc which can interrupt the radiation path, said disc has a circle sector circumference which is at least equal to that part of the circle circumference which is determined by the sum of the quotient of the field blanking duration and the field period, and the said fraction.

The invention will now be described in greater detail by way of example with reference to the accompanying drawings.

DETAILED DESCRIPTION OF THE PREFERRED EMBODIMENT

Figure 1:
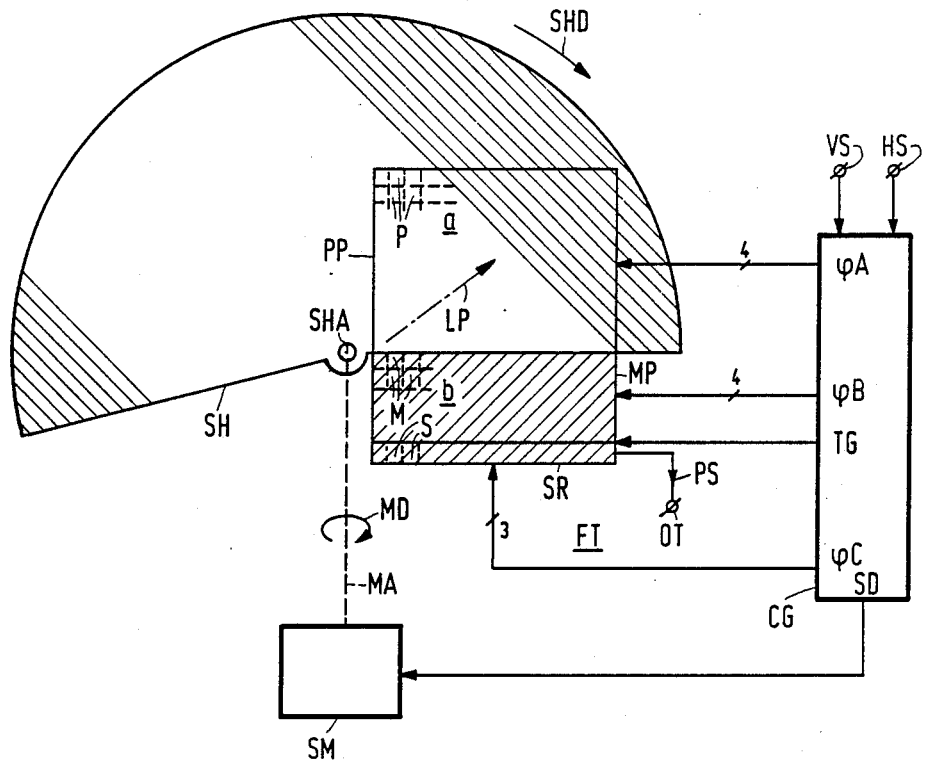
FIG. 1 diagrammatically shows an embodiment of a camera according to the invention.

In FIG. 1 the reference denotes a solid-state sensor of the charge transfer type, particularly a frame transfer sensor. The sensor FT comprises a picture pick-up member PP formed with pick-up elements P which are present in rows and columns. The reference a denotes the number of rows of pick-up elements P. The pick-up elements P convert radiation incident via a radiation path LP such as, for example light, into local charge packets as picture information. The sensor FT also comprises a storage member MP and a shift register member SR both of which are shielded from incident radiation, which is illustrated by means of shaded areas. The storage member MP has storage elements M present in rows and columns, whilst the reference b denotes the number of rows of storage elements M. The number a is assumed to be larger than the number b and a=2 b is given as an example. The shift register member SR is of the parallel-in, series-out type in which parallel information is picked up in shift register elements S, which information is subsequently serially shifted to a sensor signal output OT coupled to the shift register member SR.

The information processing in the sensor FT is controlled by a control signal generator CG. The references VS and HS at the generator CG denote that a field and a line synchronizing signal, respectively, are applied thereto. The signals VS and HS are associated with, for example a standardized or non-standardized television system.

Figure 3:
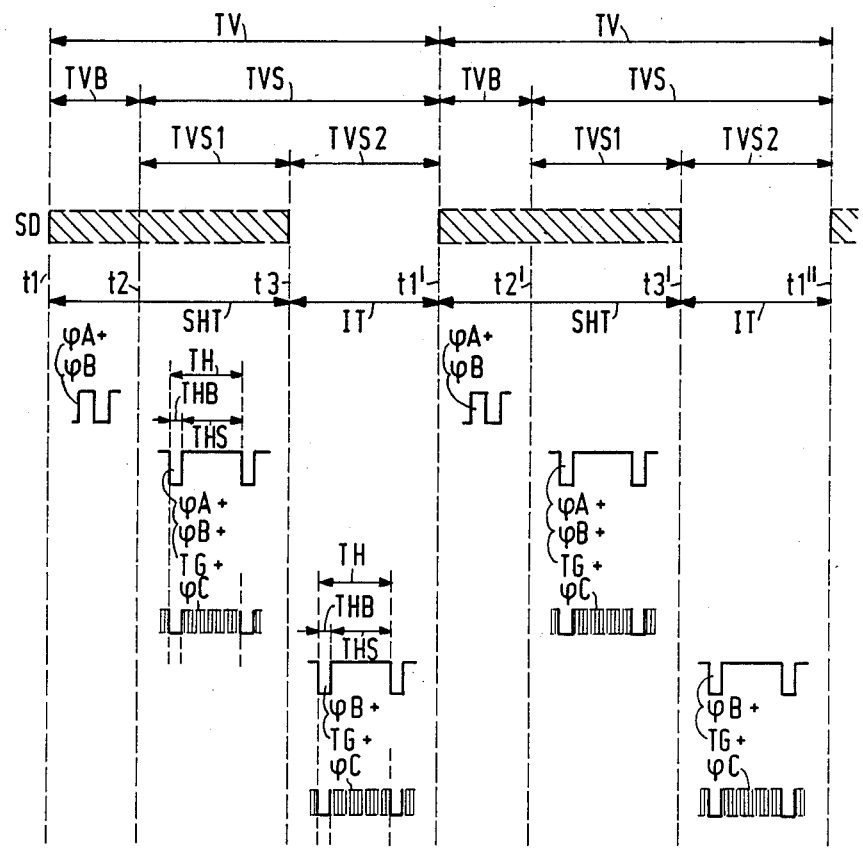
FIG. 3 shows some time diagrams to explain the operation of the camera according to FIG. 1.

The generator CG applies clock pulse signals $\phi A$, $\phi B$ and $\phi C$ to the pick-up member PP, the storage member MP and the shift register member SR, respectively. The generator CG also supplies a transfer signal TG for the information transfer between the members MP and SR. The reference numerals 4 and 3 in FIG. 1 indicate that the clock pulse signals $\phi A$ and $\phi B$ and $\phi C$ may be four-phase and three-phase, respectively. For a detailed description of components of the control signal generator CG reference is made to the Philips data handbook "Solid-State Image Sensors, Peripheral Integrated Circuits". Under the control of the generator CG the sensor signal output OT supplies a picture signal PS which is generated in line and field periods with line and field scanning periods and line and field blanking periods. In FIG. 3 the reference TV denotes field periods, TVB and TVS denote field blanking periods and field scanning periods, respectively, TH denotes line periods and THB and THS denote line blanking and line scanning periods, respectively. FIG. 3 shows time diagrams as a function of time t to be described hereinafter.

The control signal generator CG applies a control signal SD to a motor SM a spindle MA of which is diagrammatically shown with a direction of rotation MD. The motor spindle MA is coupled with a shaft SHA of a shutter SH in the form of a rotatable sector disc. The reference SHD denotes the direction of rotation of the shutter SH as is given by the shutter motor SM. The shutter SH and the motor SM constitute a shutter device (SH, SM) which is controlled by the generator CG. The shutter SH is shown with the partly shaded disc which, being present in the radiation path LP, interrupts the supply of light radiation to the pick-up member PP of the sensor FT. To obtain a shutter action which is specific of the invention, the circle sector circumference of the disc of the shutter SH has a given value which will be explained with reference to the description of FIGS. 2 and 3.

Figure 2:
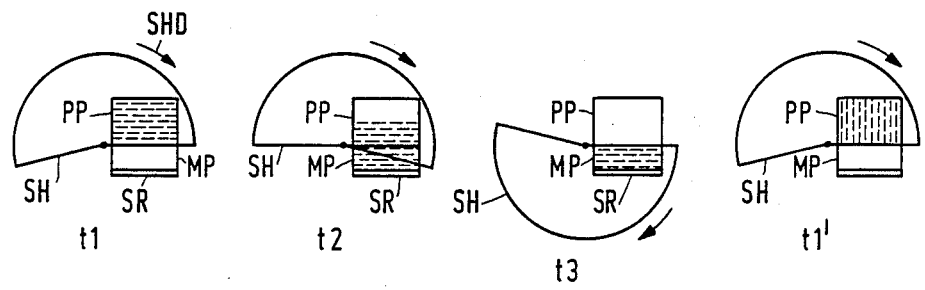
FIG. 2 illustrates the operation of the camera according to FIG. 1

To illustrate the operation of the camera according to FIG. 1, FIG. 2 shows some positions of the disc of the shutter SH, more specifically at instants t1, t2, t3 and t1'. These instants are also indicated in FIG. 3 with further instants t2', t3' and t1''. The primed notation indicates the periodical character of the instants. FIG. 3 shows that the instants t1 and t1' are associated with the commencement of a field blanking period TVB. FIG. 2 shows that the pick-up member PP is entirely shielded at the instants t1 and t1'. For this purpose incident radiation is converted into charge packets as picture information during a light radiation integration period which is denoted in FIG. 3 by a period IT before the instant t1'. This information is indicated in the pick-up member PP at the instants t1 and t1' in FIG. 2 by means of a shaded area in the row direction and the column direction, respectively of the pick-up elements P shown in FIG. 1. It is assumed that there is no (longer any) picture information present in the members MP and SR.

FIG. 2 also shows the position of the disc of the shutter SH at the instant t2 which in accordance with FIG. 3 corresponds to the final instant of the field blanking period TVB. In this case the b memory rows of the storage member MP are entirely filled with picture information so that (a-b) rows of pick-up elements P of the pick-up member PP still contain picture information. At the instant t3 shown in FIG. 2 all picture information has been supplied by the pick-up member PP and the entire surface of the pick-up member PP is cleared for the next light radiation integration until the instant t1'.

The time diagram SD and the instants t1, t2 and t3, and t1', t2' and t3', respectively, in FIG. 3 illustrate the specific shutter action. The reference SHT denotes the shutter time. The shutter time SHT shown is associated with the choice a=2b made for the number of rows a and b of the pick-up elements P and storage elements M, respectively, of FIG. 1. The instant t3 is present in the middle of the field scanning period TVS=TVS1+TVS2 so that TVS1=TVS2.

To explain the information processing in the sensor members PP, MP and SR, the clock pulse signals $\phi A$, $\phi B$ and $\phi C$ and the transfer signal TG are further shown in FIG. 3. During the field blanking period TVB the clock pulse signals A and B ensure that the storage member MP is filled, which is indicated by $\phi A + \phi B$. Subsequently, the clock pulse signals $\phi A$ and $\phi B$ and the transfer signal TG are active during the first part TVS1 of the field scanning period TVS with a parallel information transfer per line blanking period THB and the clock pulse signal $\phi C$ is active for the serial information shift during the next line scanning period THS. This is denoted by $\phi A + \phi B + TG + \phi C$ during the period TVS1 in FIG. 3 and the reference to the respective periods THB and THS. During the second part TVS2 of the field scanning period TVS only the storage member MP and the shift register member SR are controlled, which is illustrated by means of $\phi B + TG + \phi C$ and the reference to the respective periods THB and THS.

It is apparent from the description that the sensor FT of FIG. 1 which normally supplies a picture signal PS associated with a picture composed of the number of b television lines per field scanning duration TVS supplies a picture signal PS, according to the invention, associated with a picture composed of the larger number of a television lines per field scanning period TVS. An increase of the picture definition in the field scanning direction by a factor of a/b, in which a is larger than b, is the result. Associated therewith is a decrease of the line period, namely by a factor of b/a.

The shutter time SHT indicated in FIG. 3 is the minimum shutter time in case a=2b. In this case there is the maximum information integration period IT which is equal to half the field scanning period TVS.

Generally it holds that for the number of a pick-up & element rows and the number of b storage element rows (a−b) rows of information must be processed in the period TVS1 and b rows of information must be processed in the period TVS2, with a rows occurring in the period TVS. It follows that:

$$TVS1 = \frac{a-b}{a} TVS \text{ and } TVS2 = \left(\frac{b}{a}\right) TVS.$$

The result is a minimum shutter time $$SHT = TVB + \frac{a-b}{a} TVS.$$

Verbally expressed, there is thus a minimum shutter time comprising the field blanking period followed by a fraction of the field scanning period, which fraction is equal to the quotient of the difference number between the numbers of the rows of pick-up elements and of storage elements and the number of the rows of the pick-up elements.

According to FIGS. 1 and 2 the shutter device (SH, SM) has the sector disc as a shutter SH. To obtain the minimum shutter time the circle sector circumference of the disc must at least be equal to that part of the circle circumference which is determined by the sum of the quotient of the field blanking period and the field period, and the said fraction. Associated therewith is the relation that the sector circumference is at least equal to the part of the circle circumference determined by $$\frac{TVB}{TV} + \left(\frac{(a-b)}{a}\right)\left(\frac{TVS}{TV}\right).$$

Instead of the described shutter SH with the single sector of a circle, a shutter having various, evenly distributed sectors of a circle could be used whilst the rotational speed of the shutter is decreased by a factor which is equal to the number of sectors of the circle. A shutter device including, for example a liquid crystal shutter being operative with the described shutter time, could be used without any further measures.

The following is given by way of numerical example. It is assumed that TV=20 ms, TVB is approximately equal to 0.08 TV, TH=32μs, a=576 and b=288. In this case it holds that: TVS=576×32μs=18.432 ms, TVB=1.568 ms, IT=9.216 ms and SHT=10.784 ms. During TVB=1.568 ms 288 rows of information are transferred, which involves a transfer period of 5.44μs.

Interlaced picture signals can be generated in known manner by the sensor FT by causing the light integration at the four-phase clock pulse signals φA to be effected with a barrier at the pick-up elements B by a third-phase clock pulse signal in the first field period and by a first-phase clock pulse signal in the second field period. Instead of using the four-phase clock pulse control, a two-phase clock pulse control may be used to generate the interlaced picture signal in an optimum manner. Furthermore, the shift register member SR may comprise various sub-registers in known manner.

For the sake of completeness it is to be noted that in the case in which the camera is suitable for recording photographic images the shutter device (SH, SM) can be used, or a separate shutter for setting the exposure time is used in the case of an opened shutter SH.

It is also possible that an additional shift register member, which is suitable for both parallel-in, parallel-out and parallel-in, series-out information processing, is arranged between the pick-up member PP and the storage member MP.

What is claimed is:

1. A camera suitable for recording at least television and cinematographic images, which camera includes a solid-state sensor of the charge transfer type, said sensor comprising a picture pick-up member for converting in its pick-up elements radiation incident via a radiation path into local charge packets as information, a storage member comprising storage elements for storing the picture information, the pick-up and storage elements being present in rows and columns and the number of rows of storage elements being smaller than the number of rows of pick-up elements, and a parallel-in, series-out shift register member which is coupled to a sensor signal output for the supply of a picture signal as picture information generated in line and field periods with line and field scanning periods and line and field blanking periods, said camera also including a shutter device arranged in the radiation path towards the picture pick-up member of the sensor and a control signal generator for controlling the picture information transfer in the sensor and for controlling the shutter device for passing or not passing radiation, characterized in that the shutter device shuts off the radiation path towards the pick-up member of the sensor for a shutter time (SHT) substantially defined by the relationship SHT=TVB+((A−B)/A)TVS, where TVB is the field blanking period, TVS is the field scanning period, A is the number of rows of pick-up elements, and B is the number of rows of storage elements.

2. A camera according to claim 1, wherein said shutter device comprises a rotatable sector disc arranged to interrupt the radiation path, said rotatable sector disc having a sector circumference (SC) substantially defined by SC/C=(TVB/TV)+((A−B)/A)(TVS/TV) where C is the circumference of a circle of which said rotatable sector disc is a sector thereof, and TV is a field period equal to TvS+TvB.

3. A camera according to claim 2, wherein: said camera is further suitable for recording photographic images.

4. A camera according to claim 1, wherein: said camera is further suitable for recording photographic images.

* * * * *